(12) United States Patent
Li et al.

(10) Patent No.: US 10,273,054 B2
(45) Date of Patent: Apr. 30, 2019

(54) COLOR-CHANGING CONTAINER WITH TWO-DIMENSIONAL AND/OR THREE-DIMENSIONAL PATTERN

(71) Applicant: SKY 2000 INT'L CO., LTD., Tainan (TW)

(72) Inventors: Kun-Che Li, Tainan (TW); Jung-Chih Chen, Tainan (TW)

(73) Assignee: Sky 2000 Int'l Co., Ltd., Tainan (TW)

( * ) Notice: Subject to any disclaimer, the term of this patent is extended or adjusted under 35 U.S.C. 154(b) by 0 days.

(21) Appl. No.: 15/680,387

(22) Filed: Aug. 18, 2017

(65) Prior Publication Data

US 2019/0055064 A1    Feb. 21, 2019

(51) Int. Cl.
*B65D 25/20*    (2006.01)
*B29C 45/14*    (2006.01)
*B29L 31/00*    (2006.01)

(52) U.S. Cl.
CPC ...... *B65D 25/205* (2013.01); *B29C 45/14688* (2013.01); *B29C 2045/14696* (2013.01); *B29C 2045/14704* (2013.01); *B29C 2045/14713* (2013.01); *B29K 2995/0021* (2013.01); *B29L 2031/712* (2013.01)

(58) Field of Classification Search
CPC .... B29C 45/14688; B29C 2045/14213; B29C 2045/14696; B29C 2045/14704; B29K 2996/0021; B29L 2031/712; B65D 25/20; B65D 25/205; B65D 85/00
USPC ...................................... 206/459.1
See application file for complete search history.

(56) References Cited

U.S. PATENT DOCUMENTS

| | | | |
|---|---|---|---|
| 8,790,759 B2 * | 7/2014 | Frankhuisen | B65D 25/205 428/35.7 |
| 9,597,825 B2 * | 3/2017 | Schmidt | B29C 43/222 |
| 10,029,841 B2 * | 7/2018 | Gaines | B65D 75/04 |
| 2011/0192750 A1 * | 8/2011 | Kokin | B65D 1/265 206/459.1 |
| 2012/0061261 A1 * | 3/2012 | Hsu | B01D 53/261 206/459.1 |
| 2012/0267277 A1 * | 10/2012 | Frederick | A45C 3/001 206/459.1 |
| 2015/0307250 A1 * | 10/2015 | Sokol | A45C 11/00 206/484 |

(Continued)

*Primary Examiner* — Bryon P Gehman
(74) *Attorney, Agent, or Firm* — Rosenberg, Klein & Lee

(57) ABSTRACT

A color-changing container with two-dimensional and/or three-dimensional pattern is disclosed, which comprises a container body and at least one two-dimensional and/or three-dimensional pattern film. The material for making the container body is mixed with a thermochromic powder, a photochromic powder or the combination of thereof, making the color of the container body change along with the temperature change of the content or the brightness change in the environment. The two-dimensional and/or three-dimensional pattern film comprises a grating layer set on one surface of a transparent layer, and a pattern area printed partially on the other surface of the transparent layer and coated by a glue layer. Therefore, after the two-dimensional and/or three-dimensional pattern film is combined to the container body, the container body is not only has the effect of color change, but also has the different pattern changes in different angle or layer of the two-dimensional and/or three-dimensional pattern.

10 Claims, 5 Drawing Sheets

(56) References Cited

U.S. PATENT DOCUMENTS

2016/0194132 A1* 7/2016 Davidson ............... B65D 85/72
206/459.1

* cited by examiner

COLOR-CHANGING CONTAINER WITH TWO-DIMENSIONAL AND/OR THREE-DIMENSIONAL PATTERN

BACKGROUND OF THE INVENTION

Field of the Invention

The present invention relates to a color-changing container. More particularly, a color-changing container with two-dimensional and/or three-dimensional pattern is disclosed.

Description of Related Art

Please refer to FIG. 5, which is a three-dimensional exploded view of a color-changing container according to a prior art. A general commercial thermochromic container 3 is made from a plastic material, which plastic material is added and mixed with a thermochromic powder, during an injection molding process, making the whole container has the thermochromic effect after the injection molding process.

When the container 3 is loaded with the content, the thermochromic material added in the plastic material during molding process produces the color change effect due to the temperature of the content.

However, the existing thermochromic container 3 is made from the plastic material, which mixed with a certain percentage of thermochromic material, by the integratedly injection molding process. Accordingly, in order to reach the uniformity color changing, the use percentage of the thermochromic material must be reached more than a certain amount to make the thermochromic material spread uniformly in the whole thermochromic container 3. But it causes that the use amount of the thermochromic material remain high, increasing the cost of the color-changing container 3.

Besides, the existing thermochromic container 3 is integratedly injection molded by the plastic material added with the thermochromic material, so the overall container is color changed together, without other color change effect. The effect of color change is simple and cannot attract customer's attention.

SUMMARY OF THE INVENTION

Accordingly, the object of the present invention is to provide a color-changing container. More particularly, combination the color-changing container with the two-dimensional and/or three-dimensional pattern, when the container body is color changed, the change effect of the color-changing container is more diverse via the different display of the two-dimensional and/or three-dimensional pattern, thereby catching customer's attention and increasing the economic benefits.

For the above object, a color-changing container with two-dimensional and/or three-dimensional pattern comprises a container body and at least one two-dimensional and/or three-dimensional pattern film. The material for making the container body is mixed with a thermochromic powder, a photochromic powder, or the combination of thereof, making the color of the container body change along with the temperature level of the content or the brightness level in the environment. The container body comprises a bottom and a sidewall extended upwardly along the periphery of the bottom. The two-dimensional and/or three-dimensional pattern film comprises a transparent layer, which has a first surface and a second surface corresponded to each other, a grating layer set on the first surface, at least one pattern area partially set on the second surface, a glue layer set on the second surface whether that second surface has the pattern area or not, and a connecting transparent layer attached between the glue layer and the outer surface of the sidewall of the container body.

According to an embodiment of the present invention, the pattern area is filled with a pigment in its whole pattern range to form a first color layer; or the pattern area is not filled with a pigment in its pattern range to form a first blank layer; or a part of the pattern area is filled with a pigment in its pattern range to form a first color layer and another part of the pattern area is not filled with the pigment in its pattern range to form a first blank layer like hollow state.

According to an embodiment of the present invention, the first blank layer is inside the first color layer.

According to an embodiment of the present invention, the outline and/or the line of the pattern area is filled with a pigment to form a second color layer, and an area that non-second color layer corresponded to the second color layer in the pattern area is not filled the pigment to form a second blank layer like hollow state.

The advantage of the color-changing container with two-dimensional and/or three-dimensional pattern is as followed. After the two-dimensional and/or three-dimensional pattern film is combined to the container body, the color of the container body is changed along with the temperature of the content or the brightness in the environment. Especially, with the combination of the color-changing container and the two-dimensional and/or three-dimensional pattern, the different two-dimensional and/or three-dimensional patterns are displayed on the surface of the container body, making the change effect of the color-changing container more diverse, thereby catching customer's attention and increasing the economic benefits.

DETAILED DESCRIPTION OF THE PREFERRED EMBODIMENT

Figure 1:
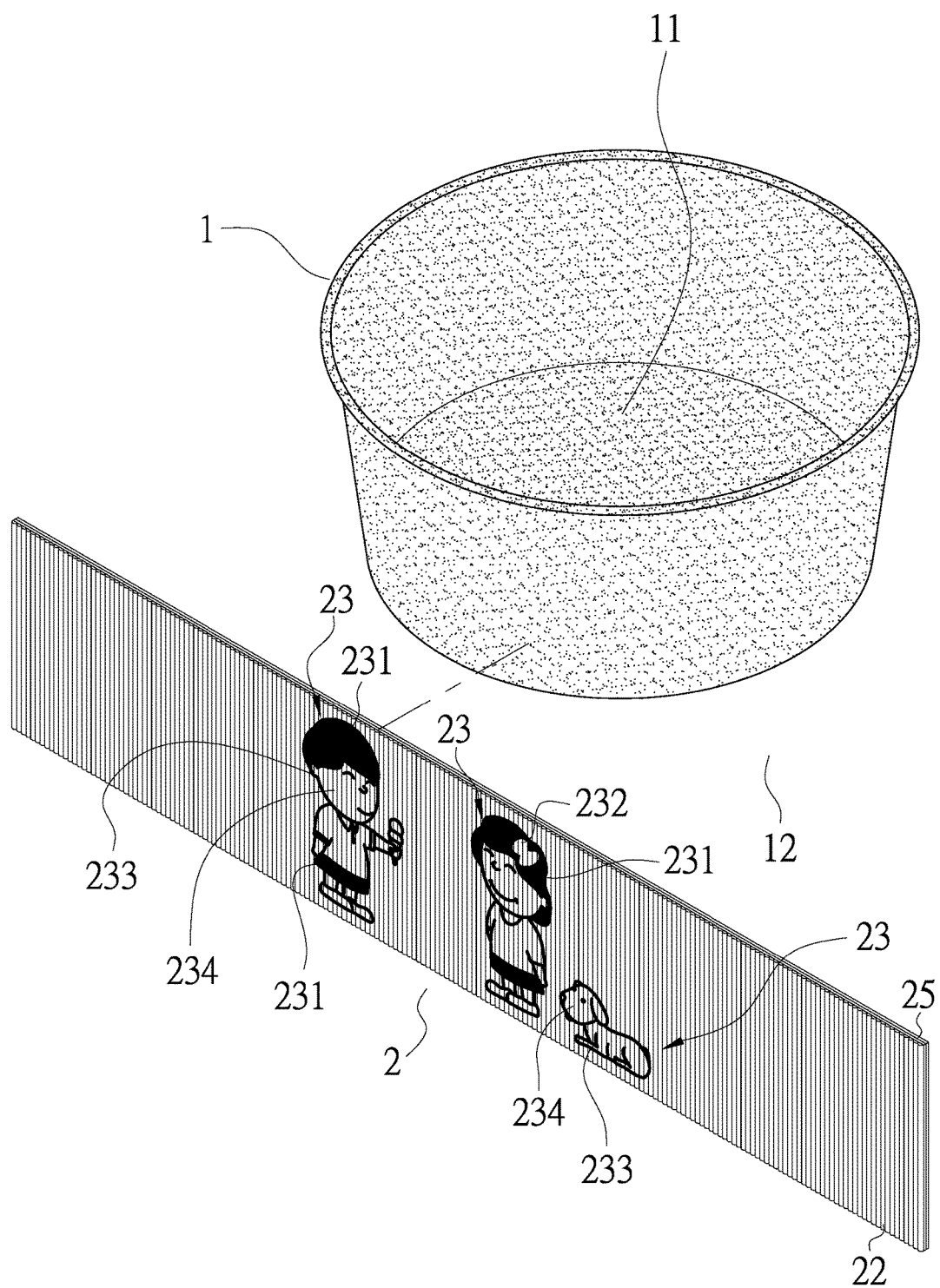
FIG. 1 is a three-dimensional exploded view of a color-changing container with two-dimensional and/or three-dimensional pattern according to an embodiment of the present invention.
Figure 2:
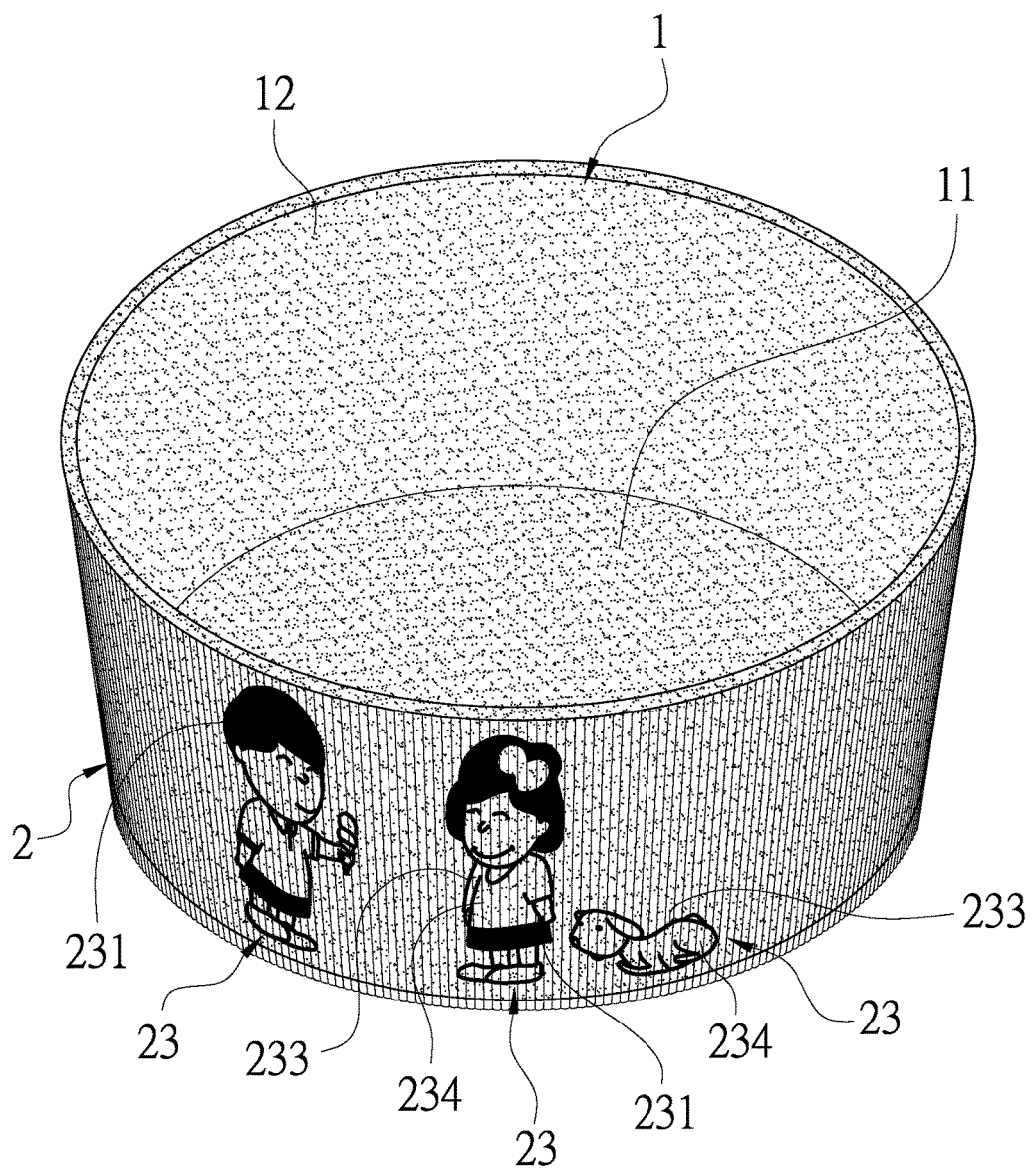
FIG. 2 is a three-dimensional perspective of a color-changing container with two-dimensional and/or three-dimensional pattern according to an embodiment of the present invention.
Figure 3:
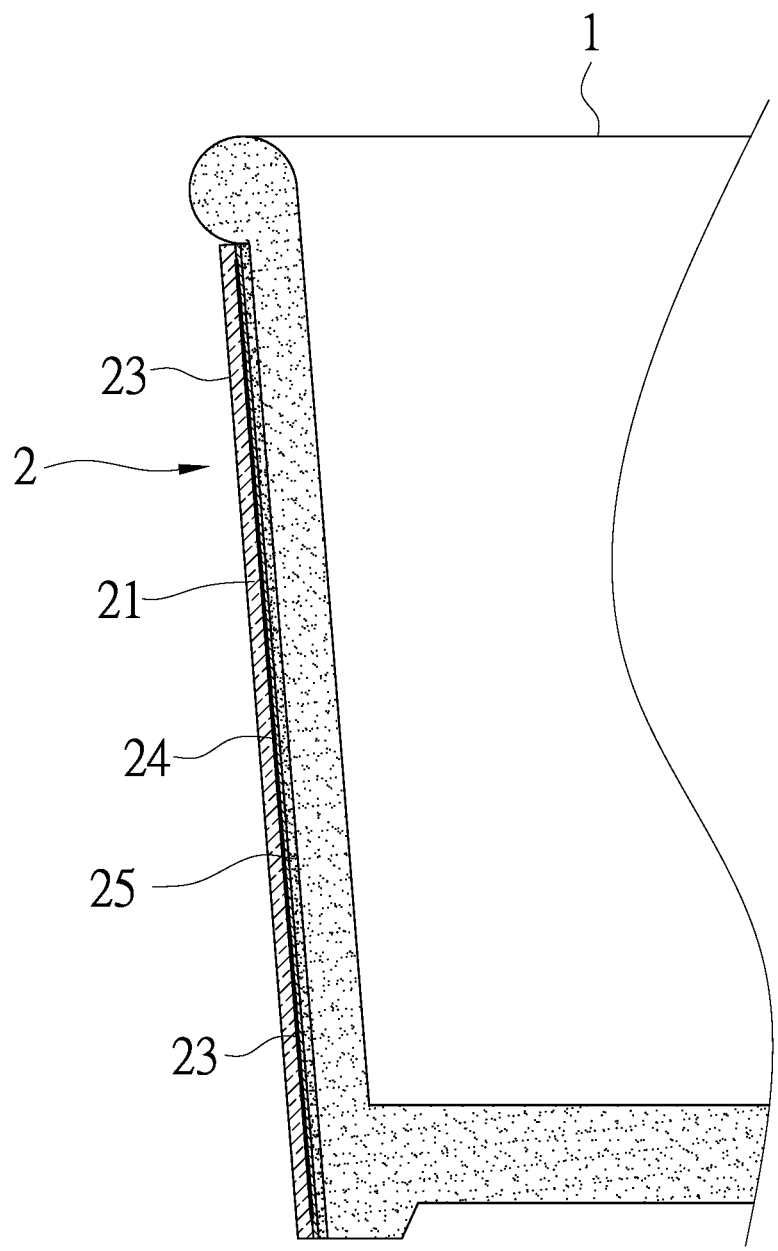
FIG. 3 is a side sectional view of a color-changing container with two-dimensional and/or three-dimensional pattern according to an embodiment of the present invention.
Figure 4:
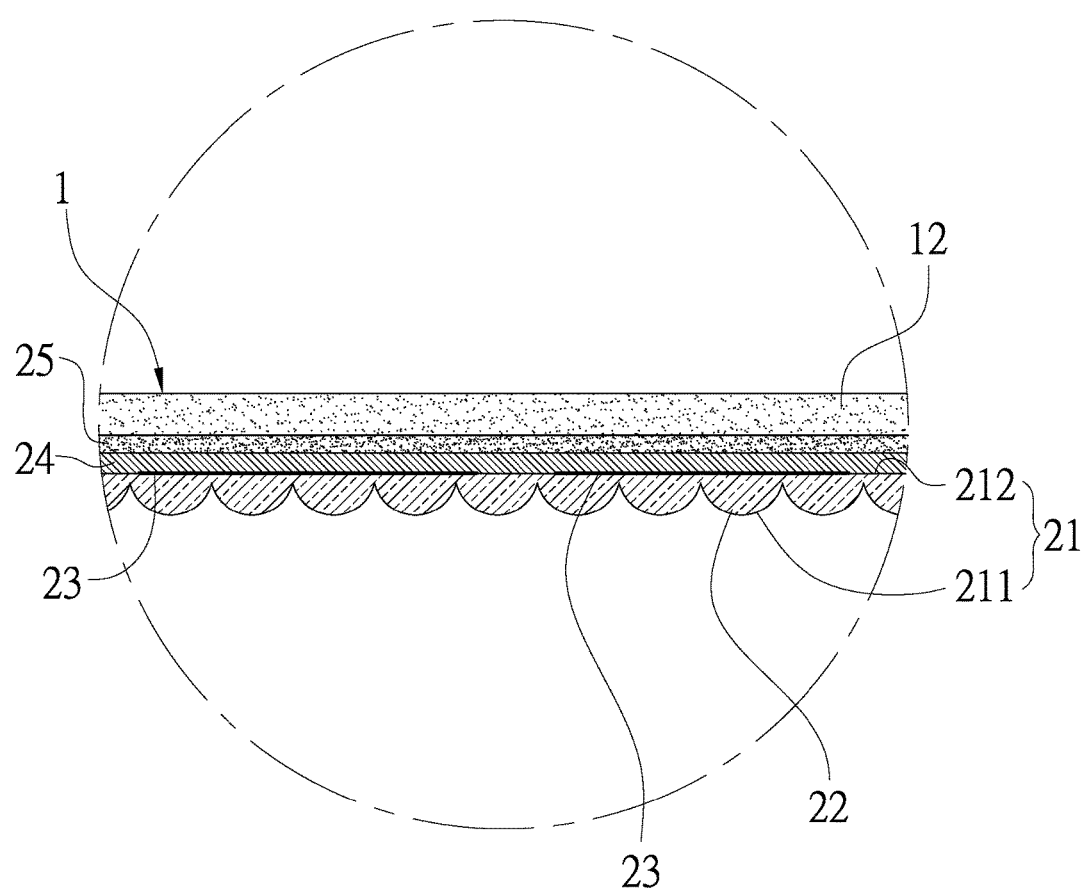
FIG. 4 is an enlarged top sectional view of a color-changing container with two-dimensional and/or three-dimensional pattern according to an embodiment of the present invention.
Figure 5:
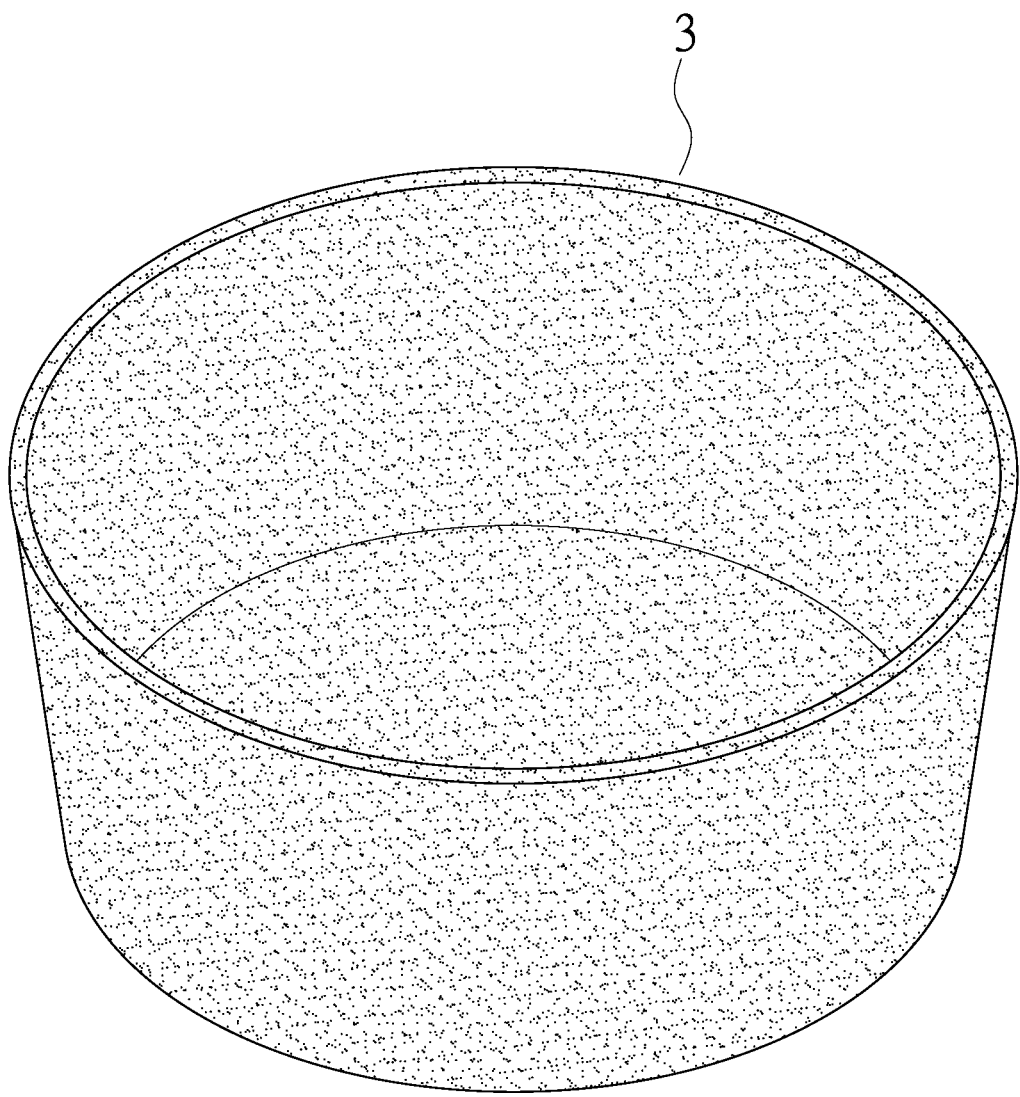
FIG. 5 is a three-dimensional exploded view of a color-changing container according to a prior art.

Please refer to FIG. 1 to FIG. 4, which are a three-dimensional exploded view, a three-dimensional perspective, a side sectional view, and an enlarged top sectional view of a color-changing container with two-dimensional and/or three-dimensional pattern according to an embodiment of the present invention.

The color-changing container with two-dimensional and/or three-dimensional a pattern comprises a container body 1 and a two-dimensional and/or three-dimensional pattern film 2.

The container body 1 comprises a bottom 11 and a sidewall 12 extended upwardly along the periphery of the bottom 11 to form a container with an upward opening. The material for making the container body 1 is mixed with a thermochromic powder, a photochromic powder, or the combination of thereof, making the color of the container body change along with the temperature change of the content or change along with the brightness change in the environment.

The two-dimensional and/or three-dimensional pattern film 2 is a thin sheet and is combined to the outer surface of the sidewall 12 of the container body 1. The two-dimensional and/or three-dimensional pattern film 2 comprises a transparent layer 21, which has a first surface 211 and a second surface 212 corresponded to each other, a grating layer 22 set on the first surface 211, at least one pattern area 23 partially set on the second surface 212, a glue layer 24 set on the second surface 212 whether that second surface 212 has the pattern area 23 or not, and a connecting transparent layer 25 attached between the glue layer 24 and the outer surface of the sidewall 12 of the container body 1. The material of the connecting transparent layer 25 is the same as that of the container body 1, such as PP or PE. During the making process of the container body 1, the two-dimensional and/or three-dimensional pattern film 2 is put in the mold and then is injection molded together to combine to the container body 1, making the connecting transparent layer 25 be a connection medium and provide protection to the pattern area 23 without damage by the high temperature.

Accordingly, the color-changing container of the present invention is color changed along with the temperature level of the content or along with the brightness level in the environment, but also coupled with the different angle changes of the two-dimensional pattern and/or the different layer changes of the three-dimensional pattern on the two-dimensional and/or three-dimensional pattern film, making the changes of the color-changing container more diverse.

Please refer to FIG. 1. Each pattern area 23 is filled with a pigment in its whole pattern range to form a first color layer 231. Accordingly, when the color of the container body 1 is changed, the color changed effect of the container body 1 is not shown in the position that corresponded to the first color layer 231 of the pattern area 23, only the two-dimensional and/or three-dimensional pattern of the first color layer 231 in the pattern area 23 is shown.

According to another example of the present invention, the pattern area 23 is not filled with the pigment in its pattern range to form a first blank layer 232. When the color of the container body 1 is changed, the color changed effect of the container body 1 is shown in the position that corresponded to the first blank layer 232 of the pattern area 23. According to the other example of the present invention, a part of the pattern area 23 is filled with the pigment in its pattern range to form a first color layer 231, and the other part of the pattern area 23 is not filled with the pigment in its pattern range to form a blank layer 232 like hollow state, if the color of the container body 1 is changed, the two-dimensional and/or three-dimensional pattern is shown at the position that corresponded to the first color layer 231 in the pattern area 23, and the color changed effect of the container body 1 is shown in the position that corresponded to the first blank layer 232 of the pattern area 23, making the pattern change of the color-changing container more diverse. Furthermore, the first blank layer 232 is inside the first color layer 231. Besides, the outline and/or the line of the pattern area 23 is filled with a pigment to form a second color layer 233, and the area that non-second color layer 233 in the pattern area 23 is not filled with the pigment to form a second blank layer 234 like hollow state. When the color of the container body 1 is changed, the color change effect of the container body 1 is not shown at the position that corresponded to the outline and/or the line of the second color layer 233, but the color change effect of the container body 1 is shown at the position that corresponded to the hollow second blank layer 234. The foregoing color mode set in the pattern area 23 can be shown on the two-dimensional and/or three dimensional pattern films simultaneously, or individually, or partially.

What is claimed is:

1. A color-changing container with at least one of a two-dimensional pattern and a three-dimensional pattern visible thereon, comprising:
   a container body, comprising:
      a bottom; and
      a sidewall, extended upwardly along the periphery of the bottom; and
   at least one of a two-dimensional pattern film and a three dimensional pattern film, comprising:
      a transparent layer, comprising a first surface and a second surface opposite each other;
      a grating layer, set on the first surface;
      at least one pattern area, defined by at least an outline printed on the second surface;
      a glue layer, on the second surface and the pattern area thereon; and
      a connecting transparent layer, attached between the glue layer and the outer surface of the sidewall of the container body.

2. The color-changing container with at least one of a two-dimensional pattern and a three-dimensional pattern visible thereon according to claim 1, wherein the pattern area is filled with a pigment in an entirety thereof to form a first color layer; or
   the pattern area is not filled with a pigment within the printed outline to form a first blank layer; or
   a part of the pattern area is filled with a pigment within the printed outline to form a first color layer and another part of the pattern area is not filled with the pigment within the printed outline to form a first blank layer; or
   a part of the pattern area is filled with a pigment within the printed outline to form a first color layer, another part of the pattern area is not filled with the pigment within the printed outline to form a first blank layer, at least one of a part of the outline and a line in the pattern area is filled with another pigment to form a second color layer, and an area which is disposed in correspondence with the second color layer in the pattern area is not filled with the pigment to form a second blank layer.

3. The color-changing container with at least one of a two-dimensional pattern and a three-dimensional pattern visible thereon according to claim 2, wherein the first blank layer is inside the first color layer.

4. The color-changing container with at least one of a two-dimensional pattern and a three-dimensional pattern visible thereon according to claim 3, wherein the material for making the container body is mixed with a thermochromic powder, a photochromic powder, or a combination thereof.

5. The color-changing container with at least one of a two-dimensional pattern and a three-dimensional pattern visible thereon according to claim 2, wherein the material for making the container body is mixed with a thermochromic powder, a photochromic powder, or a combination thereof.

6. The color-changing container with at least one of a two-dimensional pattern and a three-dimensional pattern visible thereon according to claim 1, wherein at least one of the outline and a line in at least a portion of the pattern area is filled with a pigment to form a color layer, and at least a portion of an area external to the color layer in the pattern area is not filled the pigment to form a blank layer.

7. The color-changing container with at least one of a two-dimensional pattern and a three-dimensional pattern visible thereon according to claim 6, wherein the material for making the container body is mixed with a thermochromic powder, a photochromic powder, or a combination thereof.

8. The color-changing container with at least one of a two-dimensional pattern and a three-dimensional pattern visible thereon according to claim 1, wherein a part of the pattern area is filled with a pigment to form a first color layer, a part of at least one of the outline and a line in the pattern area is filled with another pigment to form a second color layer, and an area disposed in correspondence with the second color layer in the pattern area is not filled with the pigment to form a blank layer.

9. The color-changing container with at least one of a two-dimensional pattern and a three-dimensional pattern visible thereon according to claim 8, wherein the material for making the container body is mixed with a thermochromic powder, a photochromic powder, or a combination thereof.

10. The color-changing container with at least one of a two-dimensional pattern and a three-dimensional pattern visible thereon according to claim 1, wherein the material for making the container body is mixed with a thermochromic powder, a photochromic powder, or a combination thereof.

* * * * *